(12) United States Patent
Haug (10) Patent No.: US 11,112,329 B2
(45) Date of Patent: Sep. 7, 2021

(54) APPARATUS AND METHOD FOR TESTING PACKAGE INTEGRITY

(71) Applicant: Haug Quality, Inc., Reno, NV (US)

(72) Inventor: Brian Haug, Reno, NV (US)

( * ) Notice: Subject to any disclaimer, the term of this patent is extended or adjusted under 35 U.S.C. 154(b) by 95 days.

(21) Appl. No.: 16/705,090

(22) Filed: Dec. 5, 2019

(65) Prior Publication Data

US 2021/0172822 A1      Jun. 10, 2021

(51) Int. Cl.
*G01M 3/10*      (2006.01)

(52) U.S. Cl.
CPC .................................. *G01M 3/103* (2013.01)

(58) Field of Classification Search
CPC ...... G01M 3/027; G01M 3/103; G01M 3/147; G01M 3/187; G01M 3/227; G01M 3/3218
See application file for complete search history.

(56) References Cited

U.S. PATENT DOCUMENTS

| | | |
|---|---|---|
| 4,887,457 A | 12/1989 | Humbarger |
| 5,111,684 A | 5/1992 | Stauffer |
| 5,323,642 A * | 6/1994 | Condon ............... G01M 3/02 73/37 |
| 7,571,636 B2 | 8/2009 | Mayer |
| 8,485,022 B2 | 7/2013 | Hanson |
| 9,766,152 B2 | 9/2017 | Kostelc et al. |
| 9,810,600 B2 | 11/2017 | Wetzig et al. |
| 2016/0349138 A1 * | 12/2016 | Fu ....................... B65B 29/022 |

FOREIGN PATENT DOCUMENTS

EP           2208980 A1 *   7/2010   ............ G01M 3/103

\* cited by examiner

*Primary Examiner* — David Z Huang
(74) *Attorney, Agent, or Firm* — The Law Forge; Francis D. Ward (57) ABSTRACT

An apparatus and method for testing the integrity of packaging using vacuum. The apparatus consists of tank with an interior chamber, a lid operable to allow placement of a package into the interior chamber, a hold down plate attached to the lid, a measuring device configured to measure the size of the package, and a vacuum device configured to apply vacuum to the interior chamber of the vacuum chamber. During testing the package is submerged in a liquid, then placed under vacuum until predetermined size is reached. Then the package is inspected for indications of leakage.

9 Claims, 9 Drawing Sheets

APPARATUS AND METHOD FOR TESTING PACKAGE INTEGRITY

BACKGROUND OF THE PRESENT INVENTION

This application does not claim priority from another application.

FIELD OF THE INVENTION

The present invention is an apparatus and method for detecting packaging integrity.

CROSS REFERENCE TO RELATED APPLICATIONS

Not Applicable to this invention.

REFERENCE REGARDING FEDERALLY SPONSORED RESEARCH OR DEVELOPMENT

Not Applicable to this invention.

BACKGROUND

The apparatus of the present invention generally relates to a new device for testing flexible packages for leak integrity, and to a new method for testing flexible packages for leak integrity.

Currently, in the packaging industry there exists a strong need to nondestructively test product filled packages for seal integrity, because packaged products can be damaged or destroyed by air, moisture, or other contaminates. Thus, it is important to ensure that the packages enclosing these products have no leaks. This is especially true in flexible packaging, wherein the package may be sealed by quickly using heat and clamping force, which can result in imperfect seals.

For example, a common type of package tested for seal integrity is a plastic package having three seals produced by overlapping a sheet of plastic and melting the plastic together. If the plastic is not properly melted due to the clamping force or heat applied, the seals may lack the integrity needed to properly protect the contents of the package from contamination.

Efforts have been made to provide a nondestructive methodology for evaluation of packaged products of this type to determine if leaks exist, because the seal integrity is sensitive to changes in temperature, such as from a failing heating element, or changes in clamping force or clamping time.

One of the first widely adopted procedures for detecting leaks in flexible packages is an air leak or a bubble detection procedure conducted with the flexible package immersed in water. Unfortunately, this test is a destructive test because the flexible package is pressurized by a hypodermic needle or similar device inserted into the package, and the package is submerged in water at a known pressure. Thus, the test itself compromises the integrity of the package.

Bubbles from leaks in the package are counted or captured in a graduated container providing an air over time leak rate. This test is often difficult to conduct since very small holes produce bubbles at a very low rate, thus increasing the opportunity for error because the leak may not be easily visible with the naked eye.

Another procedure for determining whether there are leaks in flexible packages is trace gas detection using positive pressure. This procedure involves the introduction of trace gases under pressure into a package to be tested. Again, the test breaks the seal integrity, making it a destructive test.

Leakage of the trace gases is then detected using specialized detection equipment. In addition to being expensive and specialized, such a procedure can result in environmental pollution of the test area and can lead to frequent incorrect positive test results.

Another trace gas test provides detection in a partial vacuum. In this testing procedure, packages are sealed in a trace gas environment and placed in a partial vacuum. The amount of gas released from a package is monitored to determine whether a leak exists. This test is destructive when the package contents are degraded by the gas and requires sensitive and expensive equipment. Environmental pollution of the test area and the item in the package can also occur, possibly resulting in false test responses.

Another known procedure for determining leaks, is a vacuum decay test. In this test, a sample flexible package is placed in a first chamber of known volume. Pressure is drawn from the first chamber to a second chamber of known volume. As this is being done, the second chamber is measured for decay in vacuum that would be caused by a leak in the package. In other words, gas leaking from the package will change the volume of gas in the chambers, resulting in a decrease in pressure. Although this procedure is very sensitive, it is difficult to use and can be expensive. Furthermore, this test does not identify the location of the leak because it only measures the change in volumes between the chambers, with the change in volumes being independent of the location of the leak.

Another destructive test involves the insertion of a needle or other device into the flexible package, air in the package is then withdrawn and the package is measured for air flow into the package. This destructive test is difficult to use, and the equipment associated with the testing is expensive. Again, the method used by this test does not identify the location of the leak, because the results of the test are independent of the location of the leak.

Methods using externally applied pressure have also been tried, wherein the flexible package is subjected to external pressure by squeezing the package between two plates. Once the pressure reaches a sufficient level, the liquid contents of the package are forced through any leaks and are detected via a visual inspection. As with other methods, this method is not sensitive to small leaks and risks rupturing test packages with the application of too much pressure This test also does not indicate the location of a leak until the product escapes the package, because the gas contained within the package cannot be detected as it escapes. Furthermore, this test risks contaminating the testing equipment because it forces the contents of the pack out onto the testing equipment, which must then be decontaminated. Thus, the test is significantly limited in speed.

Another existing system is the Pack-Vac leak detector, manufactured by Haug Quality Equipment, which uses a liquid immersion leak test that shows leaks via bubble emission, in compliance with ASTM standards. Using the Pack-Vac system, a flexible package is submerged in a liquid inside of a vacuum chamber. The pressure inside the vacuum chamber is then lowered until the flexible package expands. Then, when the flexible package expands to the point of rigidity, the internal pressure, which is now higher than the surrounding pressure, will force the gas through any hole or defect and produce a telltale stream of bubbles that is visible to the naked eye.

The downfall of the system is that inconsistent package head space, the volume of gas within the flexible package, can reduce the pressure differential so the internal pressure is not sufficient to produce visible bubbles.

One of the most critical drawbacks to existing leak detection systems is that the packages as output by packaging machines do not consistently contain the same gas head space inside of the package. Thus, tests relying on changes in internal package pressure cannot be easily standardized because a package containing less gas requires a higher vacuum level to create the internal pressure to force gas through compromised seals. Alternatively, if the package contains a higher amount of gas, the pressure of the test could explosively rupture a seal thereby compromising the test, as well as destroying the package.

Furthermore, the altitude and ambient pressure of the packaging plant also affect the vacuum or pressure levels needed for testing and can lead to inconsistent results as the ideal vacuum at one facility is not the same as at another facility. The below described new apparatus and method was developed to overcome these flaws inherent in the existing testing methods.

SUMMARY OF THE INVENTION

The present vacuum testing method and apparatus allow for consistent test results by overcoming the problems inherent in existing testing systems. The present apparatus overcomes the above described problems by applying vacuum to the flexible package until the package reaches a predetermined size, rather than a set vacuum level. This allows the new testing method to be tailored to a specific package without regard to the volume of air contained in the package or the ambient pressure of the testing facility because the ideal size of the package is the size at which the internal pressure is sufficient to force internal gas through any holes existing in the packaging. Thus, by using the size of the package as the testing parameter rather than the vacuum level, as used by existing testing equipment, the new apparatus avoids problems with changes in elevation and varying volumes of gas inside the flexible packaging.

The following descriptions describe possible embodiments of a test apparatus; however, the test apparatus can made in a variety of forms, as will be obvious to anyone skilled in the art.

In one possible embodiment, the test apparatus consists of a tank or vacuum chamber, with at least one transparent viewing port, through which a flexible package inside the vacuum chamber may be viewed. A hold down plate is attached to a top panel of the vacuum chamber, so that when the vacuum chamber is partially filled with water, or another suitable liquid, the flexible package is held completely submerged in the liquid. A measuring plate, attached to at least one guide rod, is placed in the vacuum chamber such that it will contact one side of the flexible package when the package is held down by the hold down plate. A measuring device is attached to the measuring plate in a way that allows the measuring device to measure the movement of the measuring plate as it travels along the guide rods.

Depending on the embodiment, the measuring device may be a simple scale printed on the side of the vacuum chamber, an electronic measuring device, or an artificial intelligence ("AI") assisted measuring device.

During a test, as the package expand under vacuum the measurement plate is moved by the expansion of the flexible package and the movement of the measurement plate can be measured using the measuring device. The testing apparatus then holds the flexible package size constant by electronically adjusting the vacuum levels using an electronic control system in conjunction with the measuring device. The electronic control system may be any type commonly used in industry and may include the following components: a programmable logic controller ("PLC"), a programmable automation controller ("PAC"), an industrial personal computer ("IPC"), a microcontroller, a supervisory control and data acquisition ("SCADA") system, or other industrial control systems known to those skilled in the art.

The above embodiment may be modified to omit the electronic control system and instead use a manual control system whereby an operator of the test apparatus manually adjusts the vacuum applied to the chamber based on the measurements output by the measuring device.

In another possible embodiment, the test apparatus consists of a vacuum chamber, with at least one viewing port, through which a flexible package inside the vacuum chamber may be viewed. A hold down plate is attached to a top panel of the vacuum chamber, so that when the vacuum chamber is partially filled with water, or another suitable liquid, the flexible package is held completely submerged in the liquid. In this embodiment, rather than using a measuring plate, the expansion of the flexible package is measured using a photoelectric sensor. The photoelectric sensor emits a beam of light across the vacuum chamber at a predetermined level. As the flexible package expands, it will interrupt the photoelectric sensor light beam when it reaches a predetermined size. The testing apparatus then holds the flexible package size constant by electronically adjusting the vacuum levels using an electronic control system.

In another further embodiment, the test apparatus consists of a vacuum chamber, with at least one viewing port, through which a flexible package inside the vacuum chamber may be viewed. A hold down plate is attached to a top panel of the vacuum chamber, so that when the vacuum chamber is partially filled with water, or another suitable liquid, the flexible package is held completely submerged in the liquid. In this embodiment, rather than using a measuring plate, the expansion of the flexible package is measured using a vision sensor in conjunction with AI leak detection. First, as the flexible package reaches a predetermined size, the vision sensor and AI measure the size of the package and automatically adjust the vacuum applied to the flexible package to maintain its predetermined size. In addition, the AI scans the information provided by the vision sensor to detect visual indications of leaks. As is readily apparent to those skilled in the art, this embodiment may use multiple vision sensors to accurately detect leaks from any location on the flexible package regardless of its size. Furthermore, this embodiment eliminates the need for operator to visually inspect each package as this can be done using the AI, which then flags suspect packages for operator review.

One possible embodiment of the testing method using the above apparatus is: opening the vacuum chamber to insert a flexible package that has been filled with product and a compressible fluid. Next, the flexible package is inserted into the vacuum chamber and placed under the hold down plate while the top lid is closed. Then, the measurement plate, if not already in position, is positioned such that it contacts the flexible package and that any dimensional change of the flexible package will move the measurement plate. Once the measurement plate is in position, vacuum is applied to the interior of the vacuum chamber, causing the flexible package to expand as the internal pressure of the flexible package increases relative to the pressure inside the vacuum chamber. As the pressure differential increases, the flexible package will become more rigid and thus push against the measurement plate and hold down plate. Because the hold down plate is fixed in position, the change in dimensions of the flexible package moves the measurement plate. Once the measurement plate reaches a predetermined point, the vacuum is adjusted to maintain the predetermined size. Depending on the embodiment, the flexible package size may be maintained manually by an operator or by an electronic control system. Next, depending on the embodiment, the operator or an electronic measuring device inspects the flexible package in the vacuum chamber for evidence of leaks, such as air bubbles escaping the flexible package.

In another possible embodiment, the apparatus for vacuum testing packaging comprises a tank with an interior chamber, a lid operable to allow placement of a package into the interior chamber, a hold down plate attached to the lid, a measuring device configured to measure the size of the package, and a vacuum device configured to apply vacuum to the interior chamber of the tank.

The apparatus may further comprise at least one viewing aperture in the tank, wherein the interior chamber may be viewed through the viewing aperture.

In addition, the apparatus may further comprise a floating plate movably attached to at least one guide rod, wherein the measuring device is further configured to measure the location of the floating plate.

The measuring device may comprise at least one of a group consisting of a photoelectric sensor, a laser sensor, a vision sensor, an artificial intelligence assisted vision sensor, a mechanical sensor, or a visual scale.

The vacuum device may comprise at least one of a group consisting of a positive displacement pump, momentum transfer pump, regenerative pump, entrapment pump, a venturi vacuum pump, or steam ejector.

The apparatus may further comprise a liquid contained within the interior chamber of the tank and a vision sensor operable to detect a gas escaping from the package into the liquid. In addition, the vision sensor may be assisted by artificial intelligence in detecting the gas escaping from the package.

The following is one possible method for vacuum testing comprising inserting a package containing a mixture of a product and a fluid in a gaseous phase into a vacuum chamber, filling the vacuum chamber with a predetermined amount of a fluid in a liquid phase, holding the flexible package submersed in the liquid fluid, sealing the vacuum chamber, applying vacuum to the vacuum chamber until the flexible package reaches a predetermined size and inspecting the flexible package for indications of leakage.

The liquid fluid used in this comprises at least one liquid fluid selected from a group consisting of water, oil, ethylene glycol, propylene glycol, or alcohol.

The inspection used in this method comprises at least one of a group consisting of an inspection of the vacuum chamber using vision sensor, an inspection of the vacuum chamber using an artificial intelligence assisted vision sensor, or an inspection of the vacuum chamber by a human observer.

The above summary of the present location system is not intended to represent each embodiment, or every aspect, of the apparatus or method. Additional features and benefits of the present apparatus and method are apparent from the detailed description, and figures below, to those skilled in the art.

DETAILED DESCRIPTION OF THE INVENTION

Referring to the drawings and initially to FIGS. 1-4, the present apparatus consists of a tank 101, which may be transparent or contain viewing ports, that is partially filled with liquid water or another suitable transparent liquid 102. The apparatus also includes a removable lid 104 with a hold down plate 103, which may consist of a perforated structure attached to the interior side of the removable lid 104.

Figure 2:
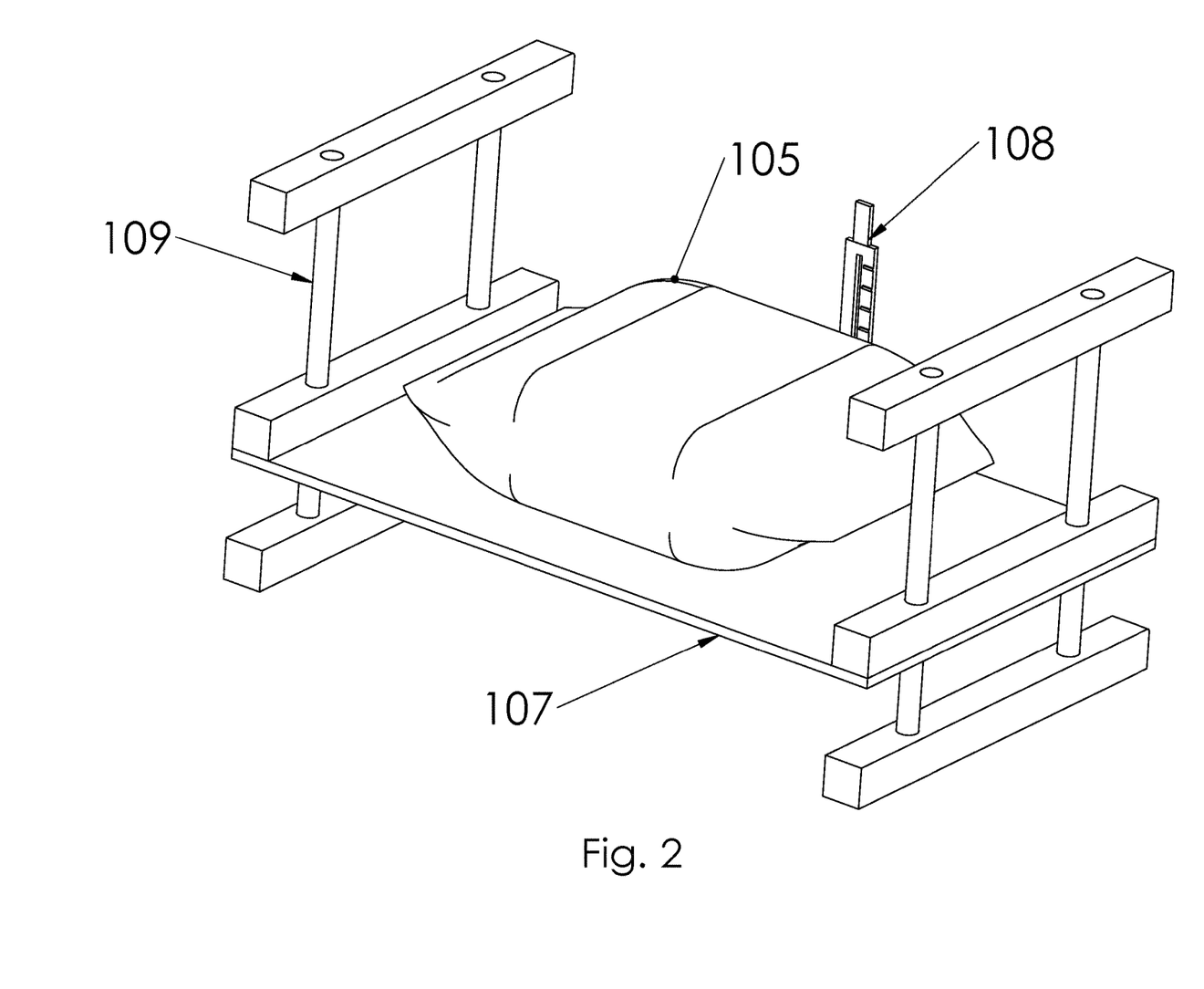
FIG. 2 is an isometric view of one possible embodiment of the Testing Apparatus Internal Fixture.
Figure 3:
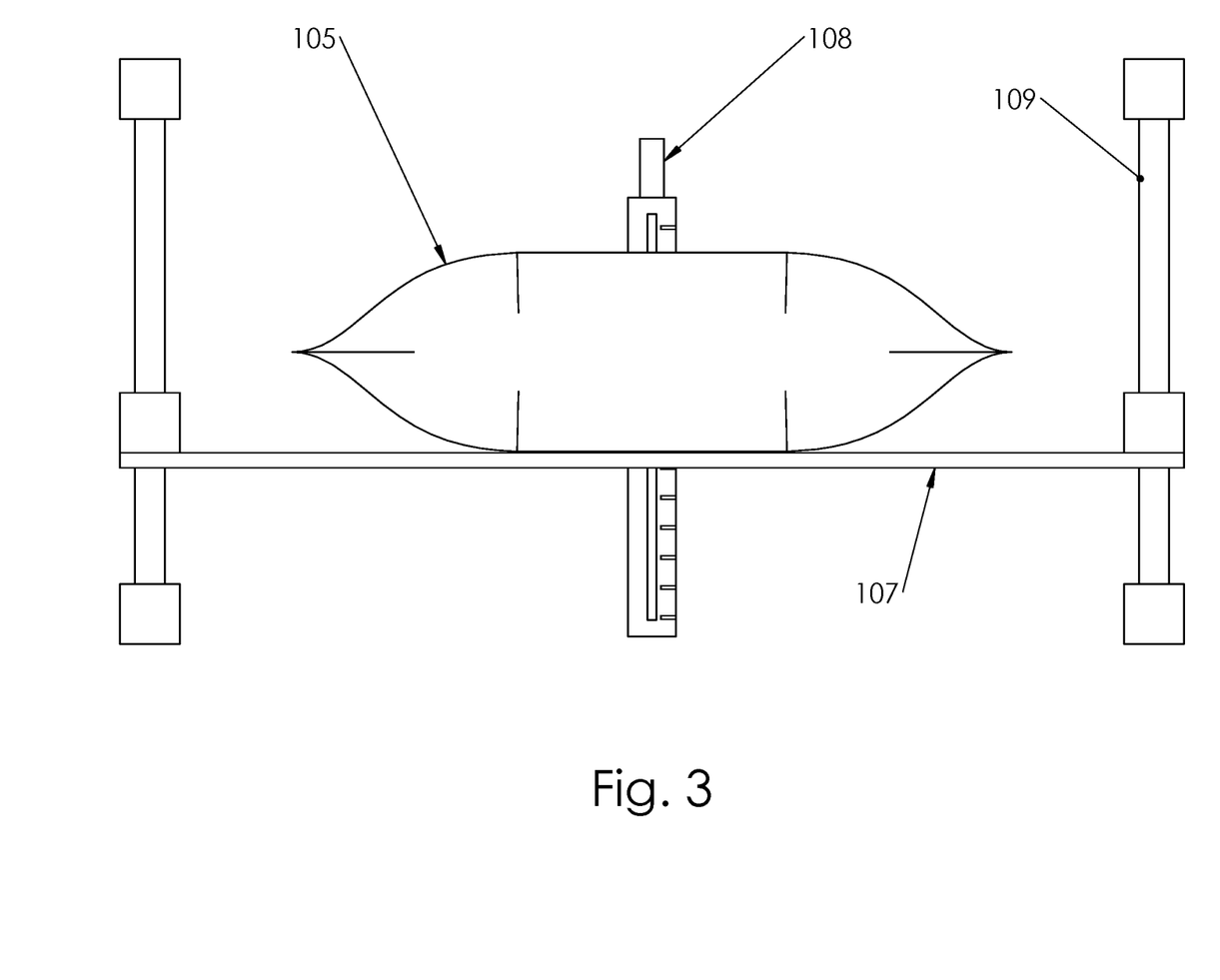
FIG. 3 is a front view of one possible embodiment of the Testing Apparatus Internal Fixture.

During operation, the hold down plate 103 acts to submerge a package 105 when the removable lid 104 is in a closed position. An internal fixture, located within the tank 101 and shown in isolation in FIGS. 2 and 3, is constructed of a floating plate 107 that can move on a guide rod 109, which allows the floating plate 107 to move linearly without skewing. A measuring device 108 monitors the vertical location of the floating plate 107. The floating plate 107 will contact the hold down plate 103 when the lid is closed and there is no package 105 inside. This empty position is considered the "zero" measurement, wherefrom all other measurements may be taken.

Figure 1:
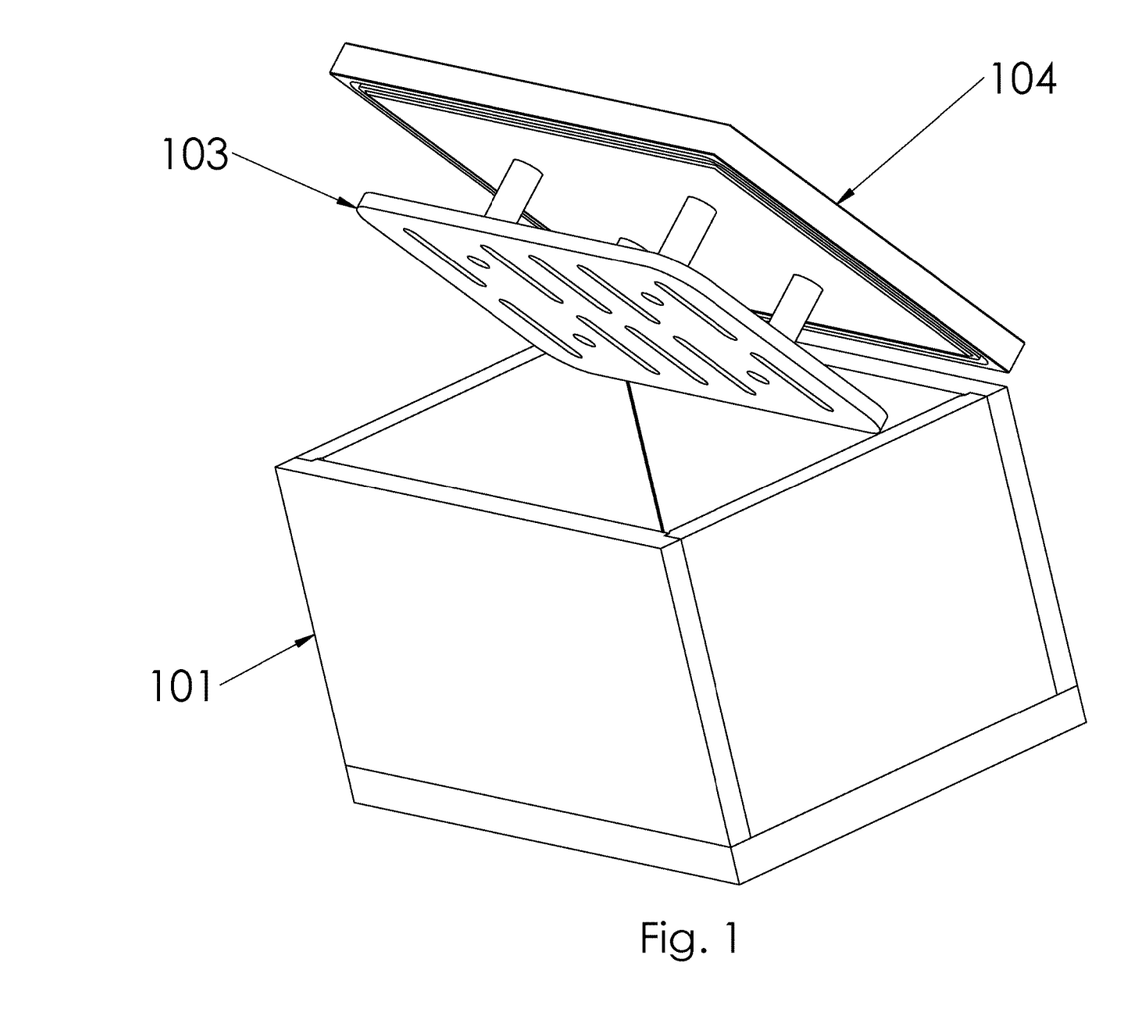
FIG. 1 is an isometric view of one possible embodiment of the Testing Apparatus Vacuum Chamber.
Figure 4:
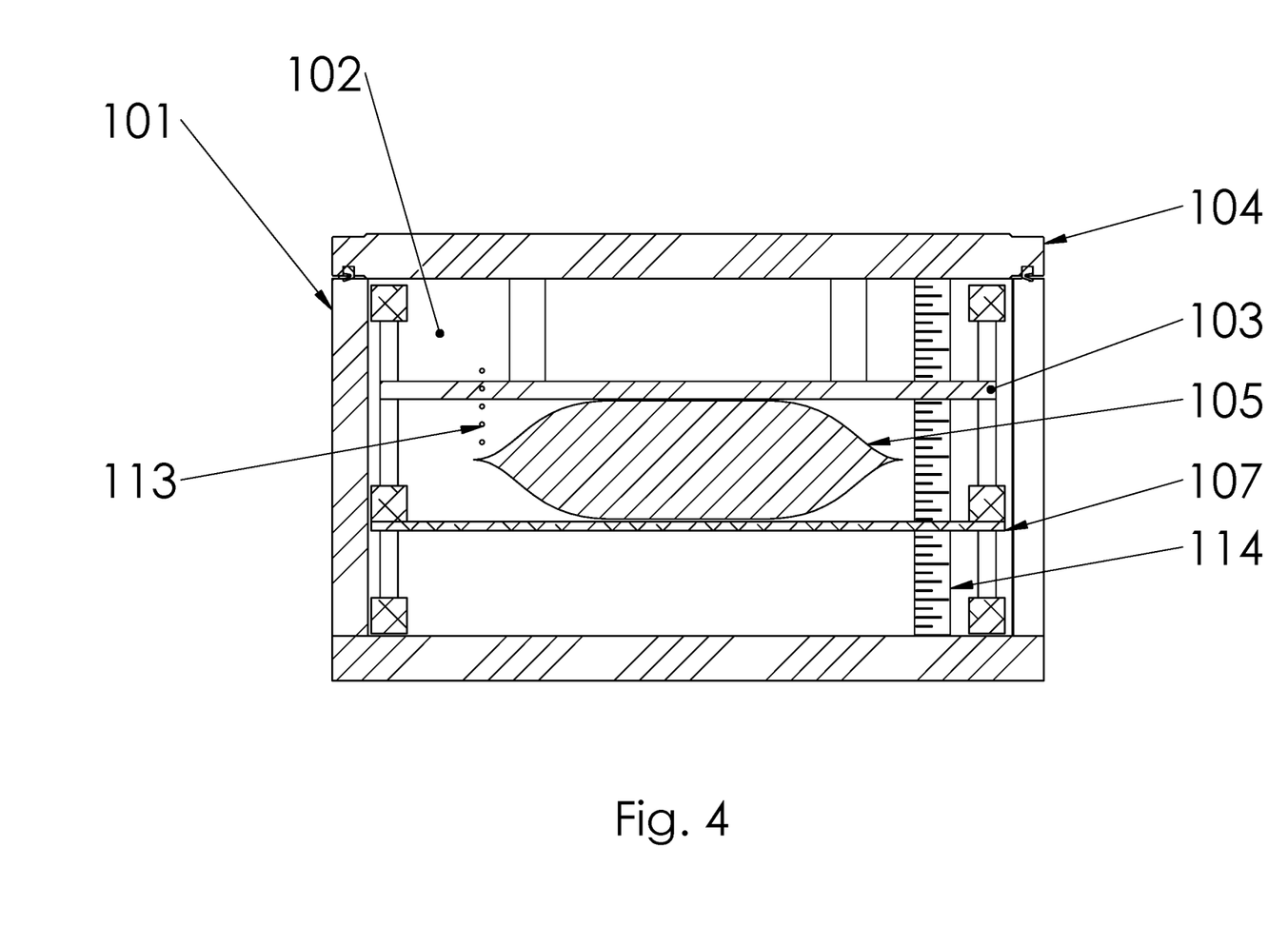
FIG. 4 is a section view of one possible embodiments of the Testing Apparatus Vacuum Chamber with Internal Fixture during testing.

During operation, the package 105 is inserted into the main chamber of the tank 101. Once the removable lid 104 is moved to the closed position, the package 105 is held in a submerged position by the hold down plate 103. As the package 105 is being submerged by the hold down plate 103, the package 105 pushes the floating plate 107 downward. Once the floating plate 107 reaches a stable position, an initial measurement of the size of the package 105 may be taken. Next, vacuum is applied to the interior of the tank 101 to decrease the pressure around the package 105.

As the pressure decreases around the package 105, gas inside the package 105 will expand in volume forcing the package 105 to become rigid while expanding in size, thereby moving the floating plate 107 away from the hold down plate 103. When a predetermined size of the package 105 is reached, the measuring device 108 is triggered. Once triggered, the measuring device 108 may automatically adjust the vacuum to maintain the package 105 at the predetermined size. Alternatively, the measuring device 108 may alert an operator to manually adjust the vacuum once the package 105 has reached a predetermined size. A visual scale 114 may also be included, or used to replace the measuring device 108, to allow an operator to visually measure the size of the package 105. Having the visual scale 114 in addition to the measuring device 108 is beneficial because it allows the operator to confirm the readings received from the measuring device 108.

As the package 105 reaches a semi-rigid state, the pressure differential ("Delta-P") between the interior of the package 105 and the interior of the tank 101 increases to a level sufficient to force gas from the interior of the package 105 through holes or other defects in the package 105. Once this semi-rigid state is reached, any leaks in the package 105 will produce a visual indication of gas escaping into the interior of the tank 101 in the form of bubbles 113, which can be visually detected by an operator or by electronic sensors.

Figure 5:
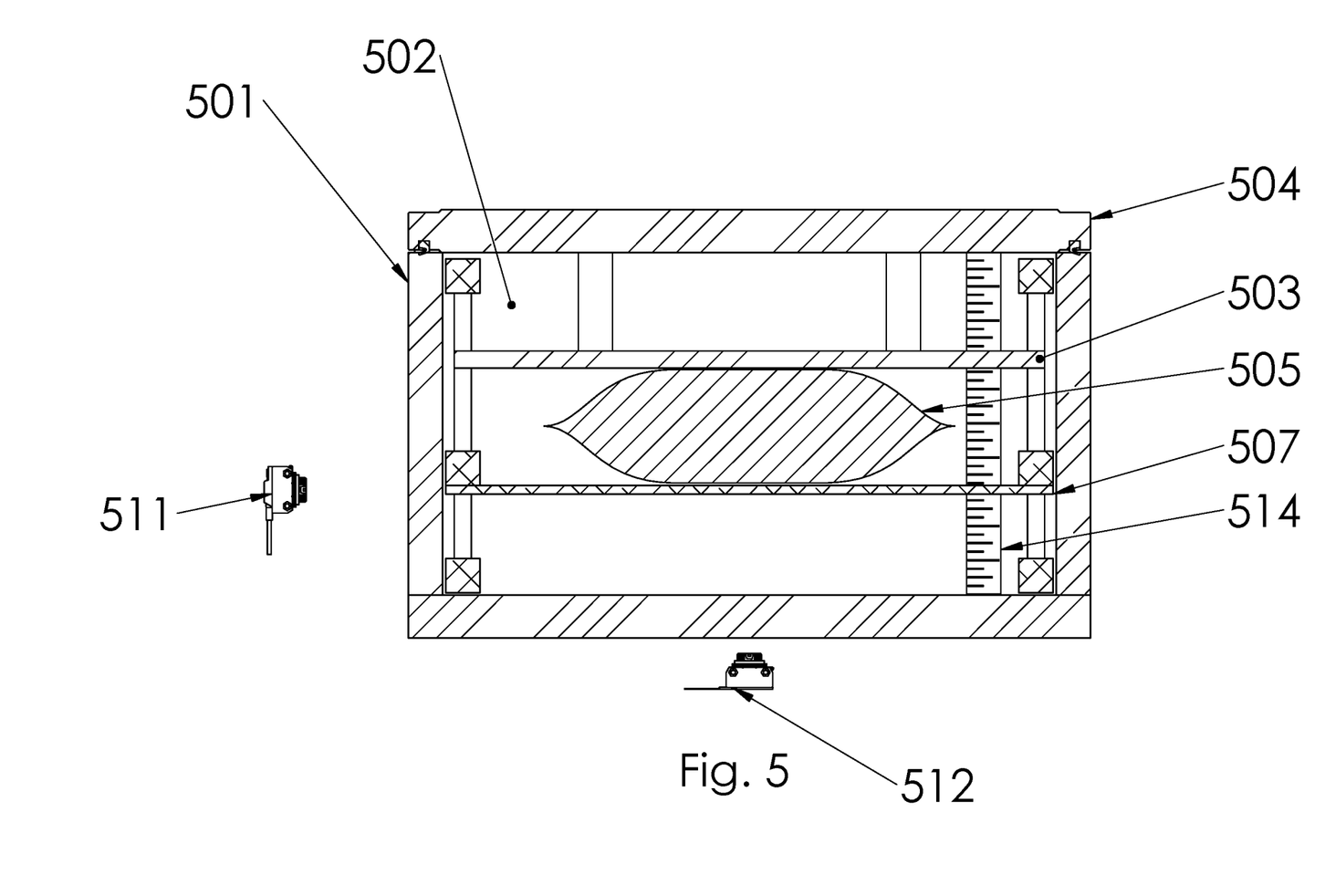
FIG. 5 is a section view of one possible embodiment of the Testing Apparatus Vacuum Chamber with Internal Fixture and Electronic Sensors.

FIG. 5 illustrates other possible embodiments of the present apparatus using different measuring devices. In one possible embodiment, the apparatus consists of a tank 501 containing a liquid 502 and has a lid 504 with a hold down plate 503 attached. During operation, a package 505 is placed inside the tank 501 and is held in a submerged position by the hold down plate 503. The interior of the tank 501 is then placed under vacuum, and gas inside the package 505 will expand in volume, thereby forcing the package 505 to expand in size.

In this embodiment, a laser 511, or other photoelectric sensor, may be mounted horizontally so that it will trigger when the floating plate 507 passes a predetermined location due to the expansion of the package 505.

Alternatively, a distance measuring laser 512 may be mounted under the floating plate 507. Mounted in this orientation, the distance measuring laser 512 measures the movement of the floating plate 507 as the package 505 expands in size. For illustrative purposes the distance measuring laser 512 is shown under the floating plate 507. However, as will be obvious to anyone skilled in the art, the distance measuring laser 512 may be mounted in any location that allows it to measure the movement of the floating plate, including on the floating plate 507 itself.

In addition, a visual scale 514 may be included, in any embodiment, so that an operator of the machine may take manual measurements of the movement of the measuring plate 507.

Figure 6:
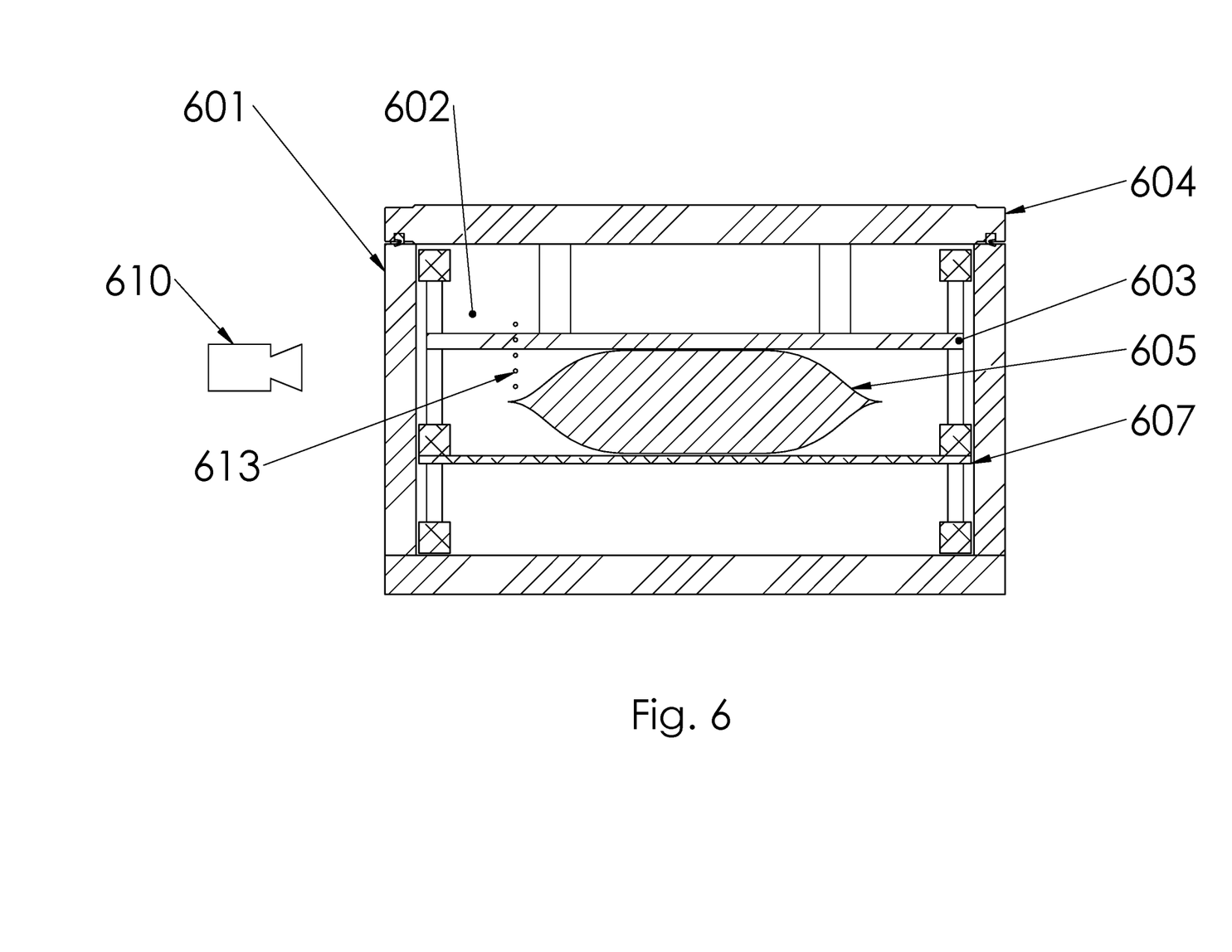
FIG. 6 is a section view of one possible embodiment of the Testing Apparatus Vacuum Chamber with Internal Fixture and Vision Sensor.

FIG. 6 illustrates another possible embodiment of the present apparatus wherein the apparatus consists of a tank 601 containing a liquid 602 and has a lid 604 with a hold down plate 603 attached. During operation, a package 605 is placed inside the tank 601 and is held in a submerged position by the hold down plate 603. The interior of the tank 601 is then placed under vacuum, and gas inside the package 605 will expand in volume, thereby forcing the package 605 to expand in size and moving a floating plate 607.

In this embodiment, a vision sensor 610 capable of detecting gas moving through the liquid 602 is mounted so that it can detect the package 605. During testing, the vision sensor 610 is positioned so that it can detect any bubbles 613 escaping the package 605, once the package 605 reaches a predetermined size. As will be obvious to anyone skilled in the art, the vision sensor may be assisted by an artificial intelligence capable of taking the inputs delivered by the vision sensor 610 and interpreting them so that the bubbles 613 may be more accurately detected.

Figure 7:
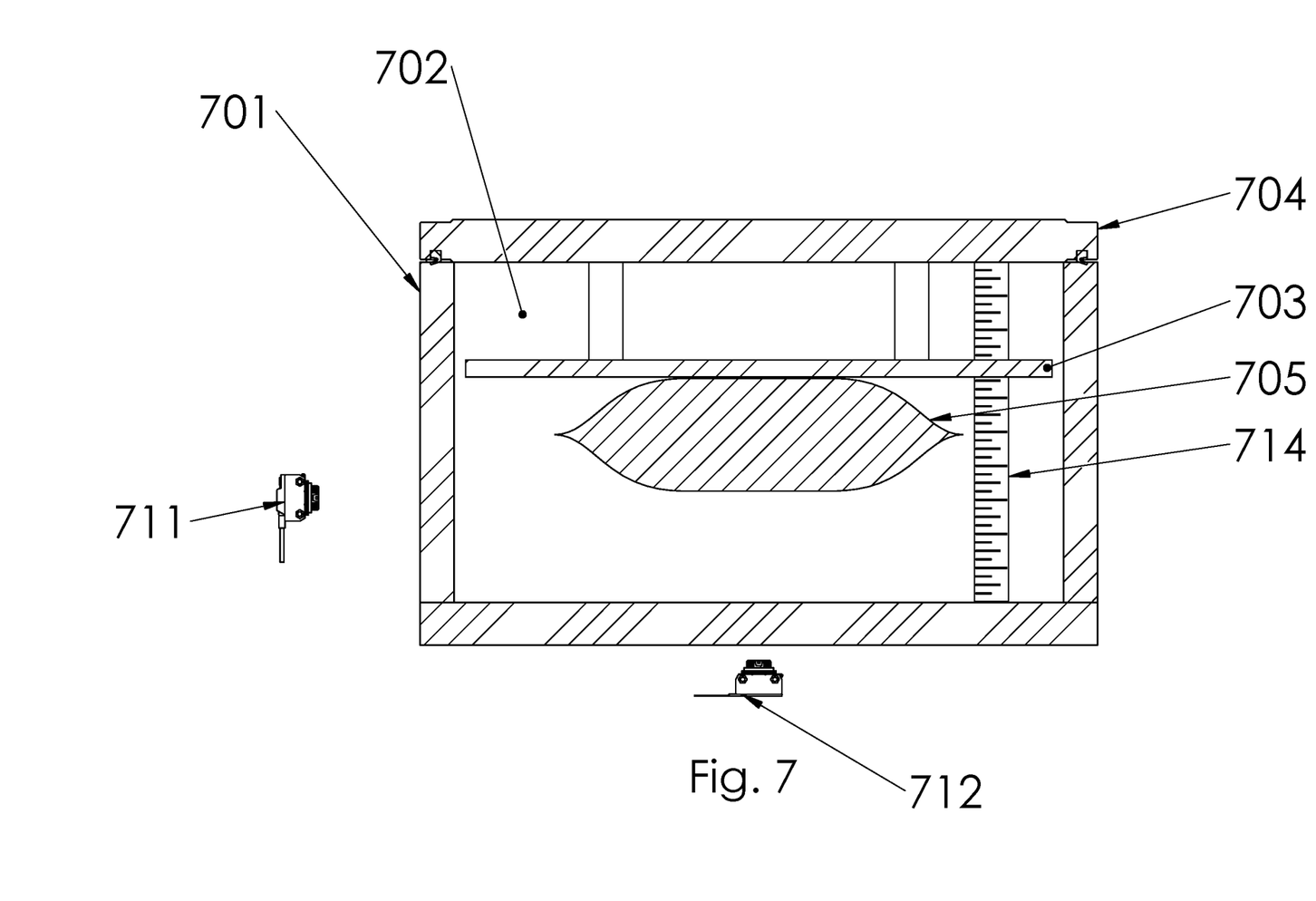
FIG. 7 is a section view of one possible embodiment of the Testing Apparatus Vacuum Chamber with Electronic Sensors and without Internal Fixture.

FIG. 7 illustrates another possible embodiment of the present apparatus without a measuring plate. In this embodiment, the apparatus consists of a tank 701 containing a liquid 702 and has a lid 704 with a hold down plate 703 attached. During operation, a package 705 is placed inside the tank 701 and is held in a submerged position by the hold down plate 703.

Then during testing, as vacuum is applied to the main chamber of the tank 701 and the package 705 begins changing in size, the size of the package 705 is directly measured by a horizontally mounted laser 711 or using a distance measuring laser 712 mounted below the package 705. As will be obvious to anyone skilled in the art, the laser 711 and distance measuring laser 712 may be mounted in numerous orientations, and the shown and described locations should be taken as merely exemplary.

As in other embodiments, a visual scale 714 may be included so that an operator of the apparatus may take manual measurements.

Figure 8:
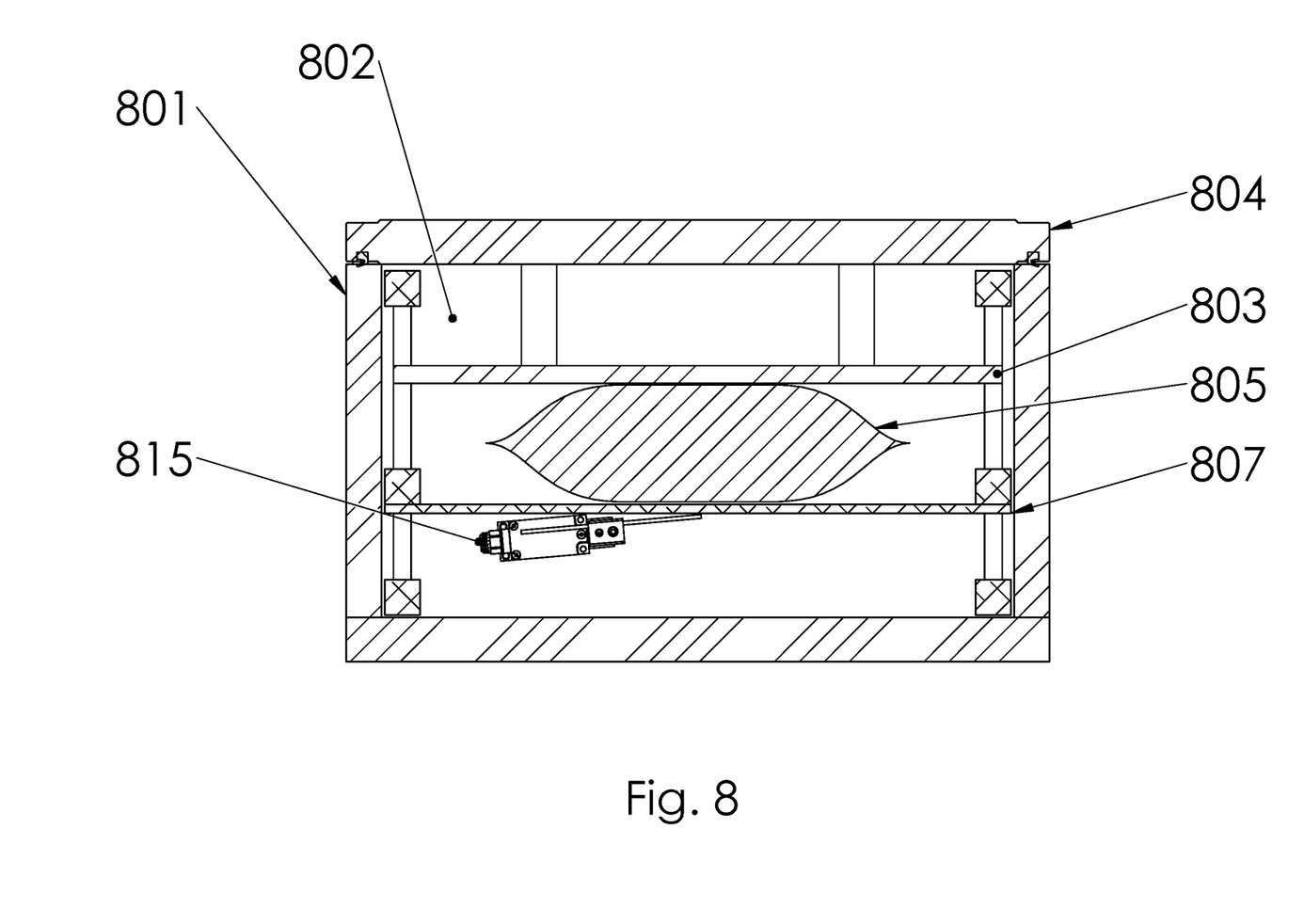
FIG. 8 is a section view of one possible embodiment of the Testing Apparatus Vacuum Chamber with Internal Fixture and a Mechanical Limit Switch.

FIG. 8 illustrates another possible embodiment the present apparatus with a mechanically actuated limit switch 815. In this embodiment, the apparatus consists of a tank 801 containing a liquid 802 and has a lid 804 with a hold down plate 803 attached. During operation, a package 805 is placed inside the tank 801 and is held in a submerged position by the hold down plate 803. The interior of the tank 801 is then placed under vacuum, and gas inside the package 805 will expand in volume, thereby forcing the package 805 to expand in size and move a floating plate 807.

During testing the package 805 is held down by the hold down plate 803. Then as vacuum is applied to the main chamber of the tank 801 and the package 805 reaches a predetermined size, the floating plate 807 triggers the limit switch 815.

Figure 9:
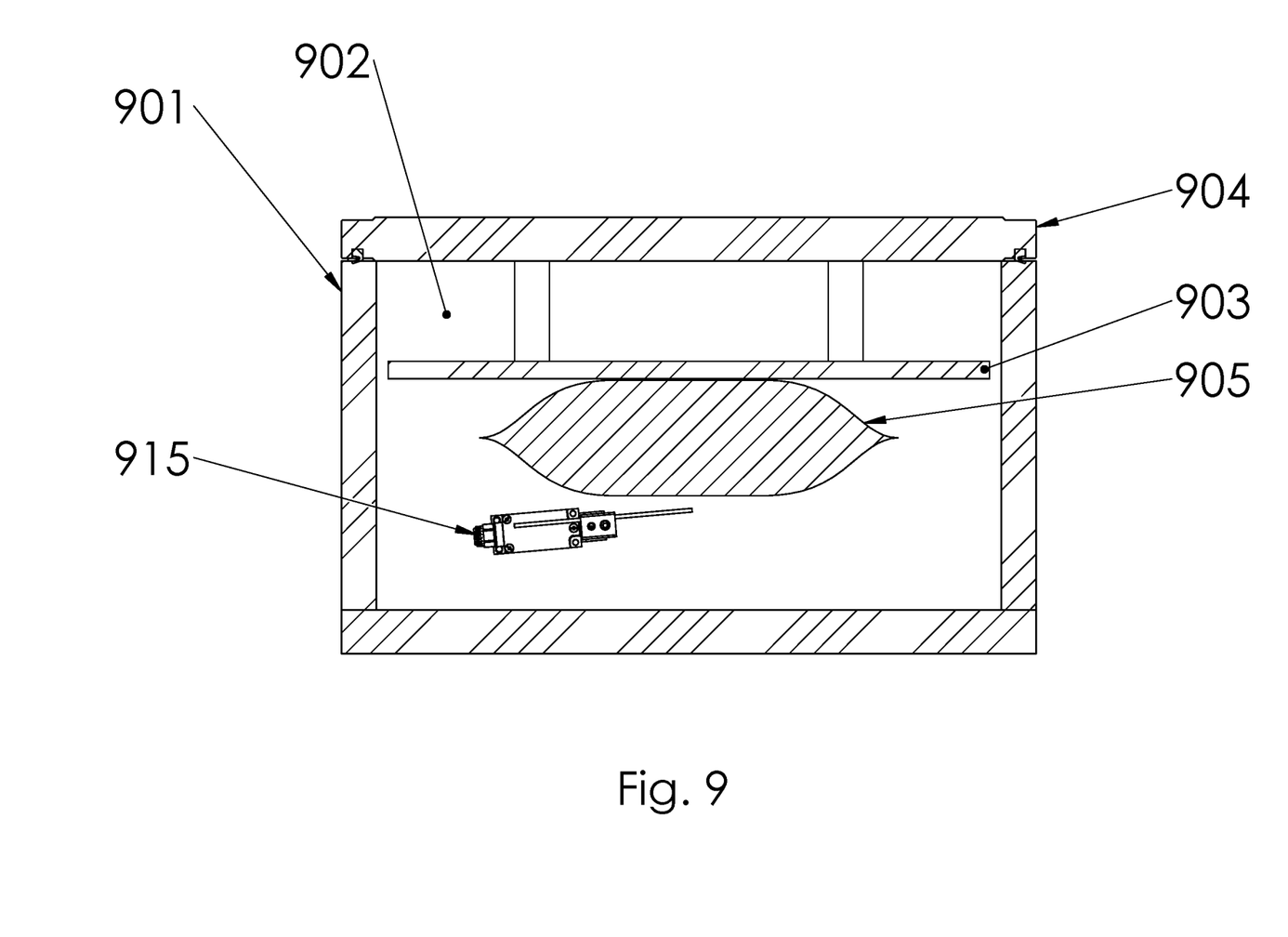
FIG. 9 is a section view of one possible embodiment of the Testing Apparatus Vacuum Chamber with a Mechanical Limit Switch and without Internal Fixture.

In FIG. 9 the illustrated embodiment of the apparatus does not include a floating plate. Instead, the limit switch 915 is directly triggered by a package 905 as the package 905 reaches a predetermined size under vacuum. In most other aspects, the embodiment illustrated in FIG. 9 is similar to previous embodiments and the apparatus consists of a tank 901 containing a liquid 902 and has a lid 904 with a hold down plate 903 attached. During operation, the package 905 is placed inside the tank 901 and is held in a submerged position by the hold down plate 903. The interior of the tank 901 is then placed under vacuum, and gas inside the package 905 will expand in volume, thereby forcing the package 905 to expand in size, thereby triggering the limit switch 915.

Numerous modifications to the features described and shown are possible. Accordingly, the described and illustrated embodiments are to be construed as merely exemplary of the inventive concepts expressed herein and addressed in the appended claims.

What is claimed is:

1. An apparatus for vacuum testing packaging comprising:
    a tank with an interior chamber;
    a lid operable to allow placement of a package into said interior chamber;
    a hold down plate attached to said lid;
    a measuring device configured to measure the size of said package;
    a floating plate movably attached to at least one guide rod, wherein said measuring device is further configured to measure the location of said floating plate; and
    a vacuum device configured to apply vacuum to said interior chamber of said tank.

2. An apparatus according to claim 1 further comprising;
    at least one viewing aperture in said tank, wherein said interior chamber may be viewed through said viewing aperture.

3. An apparatus according to claim 1, wherein said measuring device comprises at least one of a group consisting of a photoelectric sensor, a laser sensor, a vision sensor, an artificial intelligence assisted vision sensor, a mechanical sensor, or a visual scale.

4. An apparatus according to claim 1, wherein said vacuum device comprises at least one of a group consisting of a positive displacement pump, momentum transfer pump, regenerative pump, entrapment pump, a venturi vacuum pump, or steam ejector.

5. An apparatus according to claim 1 further comprising;
a liquid contained within said interior chamber of said tank; and
a vision sensor operable to detect a gas escaping from said package into said liquid.

6. An apparatus according to claim 5, wherein said vision sensor is assisted by artificial intelligence in detecting said gas escaping from said package.

7. A method for vacuum testing comprising:
inserting a flexible package containing a mixture of a product and a first fluid in a gaseous phase into a vacuum chamber;
filling said vacuum chamber with a predetermined amount of a second fluid in a liquid phase;
holding said flexible package submersed in said liquid fluid;
sealing said vacuum chamber;
applying vacuum to said vacuum chamber until said flexible package reaches a predetermined size; and
inspecting said flexible package for indications of leakage.

8. A method for vacuum testing according to claim 7, wherein said liquid fluid is at least one liquid fluid selected from a group consisting of water, oil, ethylene glycol, propylene glycol, or alcohol.

9. A method for vacuum testing according to claim 7, wherein said inspection comprises at least one of a group consisting of an inspection of the vacuum chamber using vision sensor, an inspection of the vacuum chamber using an artificial intelligence assisted vision sensor, or an inspection of the vacuum chamber by a human observer.

* * * * *